US012579303B2

(12) United States Patent
Oldham

(10) Patent No.: US 12,579,303 B2
(45) Date of Patent: Mar. 17, 2026

(54) SYSTEM AND METHOD FOR MANAGEMENT OF CONFIDENTIAL INFORMATION

(71) Applicant: QJUMPERS TECHNOLOGIES LIMITED, Tauranga (NZ)

(72) Inventor: Simon Oldham, Tauranga (NZ)

(73) Assignee: QJUMPERS TECHNOLOGIES LIMITED, Tauranga (NZ)

( * ) Notice: Subject to any disclaimer, the term of this patent is extended or adjusted under 35 U.S.C. 154(b) by 101 days.

(21) Appl. No.: 18/272,745

(22) PCT Filed: Jan. 18, 2022

(86) PCT No.: PCT/NZ2022/050005
§ 371 (c)(1),
(2) Date: Jul. 17, 2023

(87) PCT Pub. No.: WO2022/154678
PCT Pub. Date: Jul. 21, 2022

(65) Prior Publication Data
US 2024/0303372 A1 Sep. 12, 2024

(30) Foreign Application Priority Data
Jan. 18, 2021 (NZ) ........................................ 772057

(51) Int. Cl.
G06F 21/62 (2013.01)
G06Q 10/1053 (2023.01)
(52) U.S. Cl.
CPC ..... *G06F 21/6245* (2013.01); *G06Q 10/1053* (2013.01)

(58) Field of Classification Search
CPC .................................................. G06Q 10/1053
See application file for complete search history.

(56) References Cited

U.S. PATENT DOCUMENTS 9,547,637 B2 * 1/2017 Jaffe ...................... G06Q 10/10
2004/0216039 A1 * 10/2004 Lane ...................... G06Q 10/10
715/229

(Continued)

OTHER PUBLICATIONS

Formstack "User permission" https://web.archive.org/web/20180916095120/https://formstack.com/features/user-permissions> Sep. 16 2018.*

*Primary Examiner* — Frantz B Jean
(74) *Attorney, Agent, or Firm* — Maschoff Brennan

(57) ABSTRACT

A system to coordinate the receipt of data provided by applicant parties access of data received from each party to users to process applications from multiple applicant parties, comprising: a first user interface which is a) controllable by a first user to define a form to be stored and accessed by online parties to receive data from said parties, to display data received from each party and store data on the storage module, and c) receive input from the permissions module to update applicant parties' status: an applicant party interface to display to said parties the form generated, receive form data entered by each party, and receive confidential data from each party and store on the applicant data storage module: a second user interface to provide access to the confidential information of each applicant party to permit access to the data dependent on the status of said each applicant party.

13 Claims, 5 Drawing Sheets

(56)                 References Cited

U.S. PATENT DOCUMENTS

| | | | |
|---|---|---|---|
| 2007/0294092 A1* | 12/2007 | Calannio | G06Q 10/10 |
| | | | 705/321 |
| 2012/0095933 A1* | 4/2012 | Goldberg | G06F 16/335 |
| | | | 705/321 |

* cited by examiner

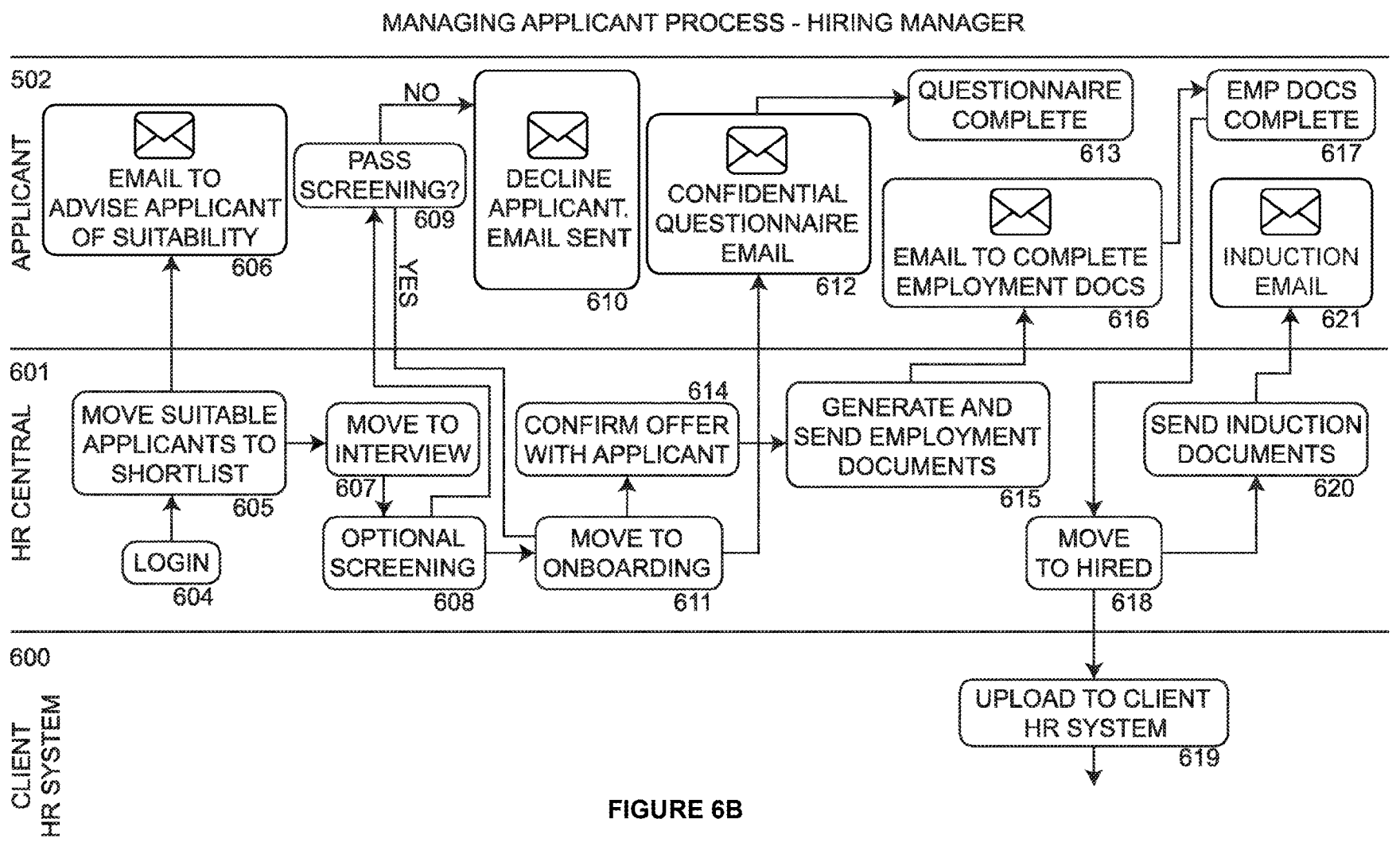

MANAGING APPLICANT PROCESS - HIRING MANAGER

EMP DOCS COMPLETE 617

INDUCTION EMAIL 621

SEND INDUCTION DOCUMENTS 620

QUESTIONNAIRE COMPLETE 613

EMAIL TO COMPLETE EMPLOYMENT DOCS 616

MOVE TO HIRED 618

UPLOAD TO CLIENT HR SYSTEM 619

CONFIDENTIAL QUESTIONNAIRE EMAIL 612

GENERATE AND SEND EMPLOYMENT DOCUMENTS 615

DECLINE APPLICANT. EMAIL SENT 610

CONFIRM OFFER WITH APPLICANT 614

MOVE TO ONBOARDING 611

PASS SCREENING? 609

NO

YES

MOVE TO INTERVIEW 607

OPTIONAL SCREENING 608

EMAIL TO ADVISE APPLICANT OF SUITABILITY 606

MOVE SUITABLE APPLICANTS TO SHORTLIST 605

LOGIN 604

502 APPLICANT

601 HR CENTRAL

600 CLIENT HR SYSTEM

FIGURE 6B

SYSTEM AND METHOD FOR MANAGEMENT OF CONFIDENTIAL INFORMATION

FIELD OF THE TECHNOLOGY

The invention generally relates to one or more computer implemented processes relating to recruitment, and in particular for the capture and management of personal information and personal confidential information during the recruitment process.

BACKGROUND

The recruitment industry is traditionally accustomed to processing a low volume of job applicants. However, there are some circumstances where large quantities of workers are desired to be hired in a short space of time. One particular industry which undergoes bulk hiring processes include seasonal work such as fruit picking.

Seasonal fruit picking requires thousands of workers to be found, recruited and onboarded over a very short space of time-typically one month. There is high competition for these workers and a company that can advertise for and onboard the workers the fastest gets a competitive advantage over slower companies. The faster company is also typically selected by clients to ensure that all fruit gets picked for their growers, and that there is no shortage of workers due to recruitment delays, ensuring all their fruit is picked.

A problem exists in collecting confidential information from each applicant who is successfully hired. Confidential information as part of recruitment includes information such as bank account details, tax numbers, next of kin details, Kiwisaver forms, proof of identity forms for every applicant. However, a recruiter is legally restricted from collecting such confidential data at the point of application and until these people have been offered work. This creates an issue where substantial documentation must be requested and processed from each hired worker before they are able to begin work—this causes substantial delays collecting the information but getting new employees entered into the payroll, health and safety, timesheet management and other HR systems. Further, from the job applicant's perspective, a potential employer seeking confidential information can be viewed as unpleasant or disconcerting.

Employers have made some effort to address this problem, including asking for some highly sensitive information at the point of applying and then also requesting for extra information and documents to be completed during bulk induction sessions.

Further, basic html questionnaires have been prepared, exported then imported into their recruitment system. However, this form of data capture is insecure and may lead to significant privacy breaches.

Furthermore, paper based processes have been used, requiring subsequent manual data entry into an Human Resources Information System (HRIS), and for documents to be scanned and uploaded into document storage systems requiring many extra data entry staff. The potential for error is high and the delay to the entire process significant.

The outcome is a slow recruitment process leading to potential new seasonal workers going to the competition, which results in fruit not getting picked on time and a significant loss to growers and the economy.

It is an object of the present invention to go at least some way toward improving on or ameliorating the abovementioned issues, or which at least provides the public with a useful choice. Other objects of the invention may become apparent from the following description which is given by way of example only.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

SUMMARY OF THE INVENTION

In one aspect, the invention consists in a computer implemented system operable to coordinate the receipt of a data provided by each of multiple applicant parties and to coordinate access of data received from each party to first and second users of the system to process applications from multiple applicant parties, the system comprising: a user permissions module, a confidential information module, a form data storage module, an applicant data storage module, and a first user interface which is a) controllable by a first user to define a form to be stored by the form data storage module and thereby accessed to be filled online by each of said parties to receive form data from each said parties, b) operable to display form data received from each one of said parties and store said form data on the applicant data storage module, and c) to receive a control input from the user permissions module to update a status of select applicant parties; an applicant party interface operable to display to said parties the form generated, to receive form data entered by each one of said parties, and to receive confidential data from each one of said parties and store said data on the applicant data storage module; a second user interface operable to provide access for a second user to the confidential information of each applicant party wherein the second user interface is controlled by the user permissions module to permit access to the data stored by the applicant document storage module and applicant data storage module dependent on the status of said each applicant party.

In some embodiments, the system is further configured to separate said form data into first and second subsets of data relating to each of multiple parties said data being processed collectively by first and second users wherein: a first user interface allows the first user to define the form used by the applicant parties to: provide the first subset of data, to allow the first user to access the first subset of data received, and subsequently update the status of given parties to indicate a status of the processing of the data, and to control the prompting of select parties to provide the second subset of data and wherein the second user interface allows a second user to access the second subset of data subsequent to the status being updated to allow the second user to access the second subset of data of each said party subsequent to a status update made under the control of the first user.

In some embodiments, the system is further configured to facilitate the collective processing by the first and second users without the first user having access to the second subset of data and with the second user having access to the second subset of data dependent on control by the first user.

In some embodiments, the user permissions module is configured to assign a permissions ranking to at least the first and second users, and wherein the system is configured to apply a threshold to the ranking, users above which are permitted access to form data stored by the form data storage module of said applicant parties dependent on the status of the applicant party.

In some embodiments, the user permissions module is configured to assign a permissions ranking to at least the users, and wherein the system is configured permit access to confidential data stored by the confidential information module of said applicant parties dependent on the status of the applicant party and ranking of the users.

In some embodiments, the job applicant status module is configured to assign data representing applicant status during a job hiring process, the status comprising data indicative of one or more of, in temporal order: Applicant identifying details; Shortlist; Interview; Onboarding; Offer approved; Verbal Offer made; Verbal Offer Accepted; Background checks requested; Background checks complete; Employment documents sent; Employment documents complete; Hired or rejected, and/or job status: Archived.

In some embodiments, the system further comprises a job applicant status module configured to transmit applicant data to a client HR system dependent on an applicant party hired status.

In some embodiments, the job applicant status module is configured to delete applicant confidential data from the confidential information module dependent on the status of the applicant party rejected status or job status: Archived.

In some embodiments, the system is configured to receive data from a client system, the data operable to change the applicant status in the applicant status module.

In some embodiments, the first interface is further controllable by the first user to define the applicant status data.

In some embodiments, the system further comprises a customer gateway operable to control access of client users to information stored in the applicant data storage module, and wherein access of the client users to the information is determined by a user status parameter stored by the permissions module.

In another broad aspect the invention consists in a system configured to separate first and second subsets of data relating to each of multiple parties said data being processed collectively by first and second users, the system comprising: a first user interface controllable by the first user to define a form operable by the parties to capture the first subset of data from the parties, and to allow the first user to access the first subset of data received and subsequently update a status of select parties to indicate a status of the processing of the captured data, and to control the prompting of select parties to provide the second subset of data and wherein a second user interface allows the second user to access the second subset of data subsequent to the status being updated to allow the second user to access the second subset of data of each said party subsequent to a status update made under the control of the first user.

In another broad aspect the invention consists in a system which is configured to: control access of the first user based on a first permissions criteria to: assemble an electronic job application form including a request for information; assemble an electronic confidential information form including a request for confidential information; store electronic job application form data completed by each of one or more job applicants via a user device; store electronic confidential information form data completed by each of one or more job applicants via a user device; populate a data structure containing data from the job application form and the confidential information form; and job data; assign a status parameter to a selection of the one or more electronic job application forms, the status parameter representing a hired applicant; facilitate access to the data of the data structure based on: a second permission criteria, and the status parameter; wherein the second permission criteria: excludes the first user status, represents a user access of a new employee processing operator.

In a broad aspect the invention consists in a computer implemented system operable to coordinate the receipt of a data provided by each of multiple applicant parties and to coordinate access of data received from each party to first and second users of the system to process applications from multiple applicant parties, the system comprising:
  a first user interface which is
    a) controllable by a first user to define a form to be filled online by each of said parties to receive form data from each said parties,
    b) operable to display form data received from each one of said parties and
    c) to receive a control input from the first user to update the status of given applicant parties;
  an applicant party interface operable to display to said parties the form generated, to receive form data entered by each one of said parties and to receive confidential data from each one of said parties;
  a second user interface operable to provide access for a second user to the confidential information of each dependent on the status of said each applicant party.

In some embodiments the system is further configured to automatically transfer specified applicant data to any third party software system in a manner that can be configured by first user to ensure compatible integration The applicant interface is operable to provide data prompting given applicant parties to provide said confidential information dependent on a control input from the first user.

Aspects of the present invention provide:
  a computer system which separates first and second subsets of data relating to each of multiple parties said data being processed collectively by first and second users wherein
    a first user interface allows a first user to define a form used by the parties to:
      provide the first subset of data,
      to allow the first user to access the first subset of data received, and
      subsequently update the status of given parties to indicate a status of the processing of the data, and
    to control the prompting of given parties to provide the second subset of data and wherein a second user interface allows a second user to access the second subset of data subsequent to the status being updated to allow the second user to access the second subset of data of each said party subsequent to a status update made under the control of the first user.

The system may allow collective processing by the first and second users without the first user having access to the second subset of data and with the second user having access to the second subset of data dependent on control by the first user.

A computer system for managing data received from multiple parties for processing by first and second users to select a subset of said multiple parties, the system comprising:
  a first user module operable to receive inputs to allow the first user to identify a first subset and second subset of information to be received by each of said multiple parties, generate a first online form with fields for data carrying said first subset of identified information and to generate a second online form with fields for data carrying said second subset of identified information, a data module operable to instantiate a data structure carrying said first and second subsets of information, wherein the data structure is defined to be suitable for receipt of the data identified by a set of two or more supported CRM/HRIM databases.

Aspects of the present invention provide a computer system which separates first and second subsets of data relating to each of multiple parties said data being processed collectively by first and second users wherein a first user interface allows a first user to define a form used by the parties to provide the first subset of data, to allow the first user to access the first subset of data received and subsequently update the status of given parties to indicate a status of the processing of the data, and to control the prompting of given parties to provide the second subset of data and wherein a second user interface allows a second user to access the second subset of data subsequent to the status being updated to allow the second user to access the second subset of data of each said party subsequent to a status update made under the control of the first user.

Aspects of the present invention provide a computer system operable to coordinate the receipt of a data provided by each of multiple applicant parties and to coordinate access of data received from each party to first and second users of the system to process applications from multiple applicant parties, the system comprising:

a first user module which is a) controllable by a first user to define a form to be filled online by each of said parties to receive form data from each said parties, b) operable to display form data received from each one of said parties and c) to receive a control input from the first user to update the status of given applicant parties;

an applicant party interface operable to display to said parties the form generated, to receive form data entered by each one of said parties and to receive confidential data from each one of said parties;

a second user module operable to provide access for a second user to the confidential information of each dependent on the status of said each applicant party.

The applicant interface may be operable to provide data prompting given applicant parties to provide said confidential information dependent on a control input from the first user.

The system may allow collective processing by the first and second users without the first user having access to the second subset of data and with the second user having access to the second subset of data dependent on control by the first user.

In one broad aspect, the invention consists in a system which is configured to: control access of the first user based on a first permissions criteria to:

assemble an electronic job application form including a request for information;

assemble an electronic confidential information form including a request for confidential information;

store electronic job application form data completed by each of one or more job applicants via a user device;

store electronic confidential information form data completed by each of one or more job applicants via a user device;

populate a data structure containing data from the job application form and the confidential information form;

assign a status parameter to a selection of the one or more electronic job application forms, the status parameter representing a hired applicant;

facilitate access to the data of the data structure based on:

a second permission criteria, and the status parameter;

wherein the second permission criteria:

excludes the first user status, represents a user access of a new employee processing operator.

In another broad aspect the invention comprises a computer implemented system operable to coordinate the receipt of a data provided by each of multiple applicant parties and to coordinate access of data received from each party to first and second users of the system to process applications from multiple applicant parties, the system comprising:

a first user interface which is controllable by a first user to define form data to be filled online by each of said parties to receive form data from each said parties;

an applicant party interface operable to display to said parties the form generated, to receive form data entered by each one of said parties and to receive confidential data from each one of said parties;

the system configured to:

populate a data structure, the structure defined by the defined form data, and populated with the applicant data inputs associated with the form data;

receive a control input from the first user to update the status of given applicant parties;

transmit the data of the data structure to a second user interface operable to provide access for a second user to the confidential information of each dependent on the status of said each applicant party.

In some embodiments, the invention relates to any one or more of the above statements in combination with any one or more of any of the other statements. Other aspects of the invention may become apparent from the following description which is given by way of example only and with reference to the accompanying drawings.

The entire disclosures of all applications, patents and publications, cited above and below, if any, are hereby incorporated by reference. This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The term "and/or" referred to in the specification and claim means "and" or "or", or both. The term "comprising" as used in this specification and claims means "consisting at least in part of". When interpreting statements in this specification and claims which include that term, the features, prefaced by that term in each statement all need to be present but other features can also be present. Related terms such as "comprise" and "comprised" are to be interpreted in the same manner.

It is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

As used herein, the terms "communication" and "communicate" may refer to the reception, receipt, transmission, transfer, provision, and/or the like of information, such as data, signals, messages, instructions, commands, and/or the like. For one module, such as a device, a system, a component of a device or system, combinations thereof, and/or the like to be in communication with another module means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit, where a third unit is located between the first unit and the second unit, processes information received from the first unit and communicates the processed information to the second unit. In some non-limiting embodiments, a message may refer to a network packet such as a data packet, and/or the like that includes data. It will be appreciated that numerous other arrangements are possible.

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers such as servers or other computerised devices, directly or indirectly communicating in the network environment may constitute a "system,". Reference to "a server" or "a processor," as used herein, may refer to a previously-recited server and/or processor that is recited as performing a previous step or function, a different server and/or processor, and/or a combination of servers and/or processors. For example, a first server and/or a first processor that is recited as performing a first step or function may refer to the same or different server and/or a processor recited as performing a second step or function. Further, reference to a server or processor may refer to a group of servers or group of processors, each configured to perform a task. Such tasks may include processes or algorithms which are undertaken by one or more servers of processors.

It is understood in advance that embodiments of this disclosure includes reference to cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Some embodiments are private clouds where the cloud infrastructure is operated solely for an organisation. Other embodiments are community clouds, where cloud infrastructure is shared by several organizations and supports a specific community that has shared concerns such as security requirements, policy, or compliance considerations. The community cloud may be managed by the organisations or a third party and may exist on-premises or off-premises. In some embodiments, a public cloud infrastructure is made available to the general public or a large industry group and is owned by an organisation selling cloud services. A cloud computing environment is service oriented with a focus on statelessness, low coupling, modularity, and semantic interoperability. At the heart of cloud computing is an infrastructure comprising a network of interconnected nodes. The cloud computing models may be managed by the organisation or a third party and may exist on-premises or off-premises One applicable implementation model for the present disclosure is by Software as a Service (SaaS). SaaS is the capability provided to the consumer is to use the provider's applications running on a cloud infrastructure. The applications are accessible from various client devices through a client interface such as a web browser. The consumer does not typically manage or control the underlying cloud infrastructure including network, servers, operating systems, storage, or even individual application capabilities.

As used herein, the term "computing device" may refer to one or more electronic devices that are configured to directly or indirectly communicate with or over one or more networks. The computing device may be a mobile device. As an example, a mobile device may include a cellular phone, smart phone, a portable computer, a smart wearable device such as watches, glasses, lenses, clothing, and/or the like, a personal digital assistant, and/or other like devices. In other non-limiting embodiments, the computing device may be a desktop computer, or other non-mobile computer. Furthermore, the term "computer" may refer to any computing device that includes the necessary components to receive, process, and output data, and normally includes a display, a processor, a memory, an input device, and a network interface.

An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly through peripheral devices.

One or more embodiments of the invention or elements thereof can be implemented in the form of a computer program product including a computer readable storage medium with computer usable program code for performing the method steps indicated. Furthermore, one or more embodiments or elements can be implemented in the form of a system (or apparatus) including a memory, and at least one processor that is coupled to the memory and operative to perform exemplary method steps. Yet further, in another aspect, one or more embodiments of the invention or elements thereof are for carrying out one or more of the process steps described in this specification. The process steps may be undertaken by any one or more of hardware module(s), software module(s) stored in a computer readable storage medium and implemented on a hardware processor, or a combination of the above.

The term "facilitating" includes performing an action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

BRIEF DESCRIPTION OF THE DRAWINGS

The invention can be better understood with reference to the following drawings. The features of the drawings are not necessarily to scale relative to each other, emphasis instead being placed upon clearly illustrating the principles of the invention. Furthermore, like reference numerals designate corresponding parts throughout the several views. Additional advantages and details of the invention are explained in greater detail below with reference to the exemplary embodiments that are illustrated in the accompanying figures.

FIG. 6B shows an exemplary hiring process, facilitated by the system, from the perspective of a system user who is a hiring manager.

DETAILED DESCRIPTION OF EMBODIMENTS

Figure 1:
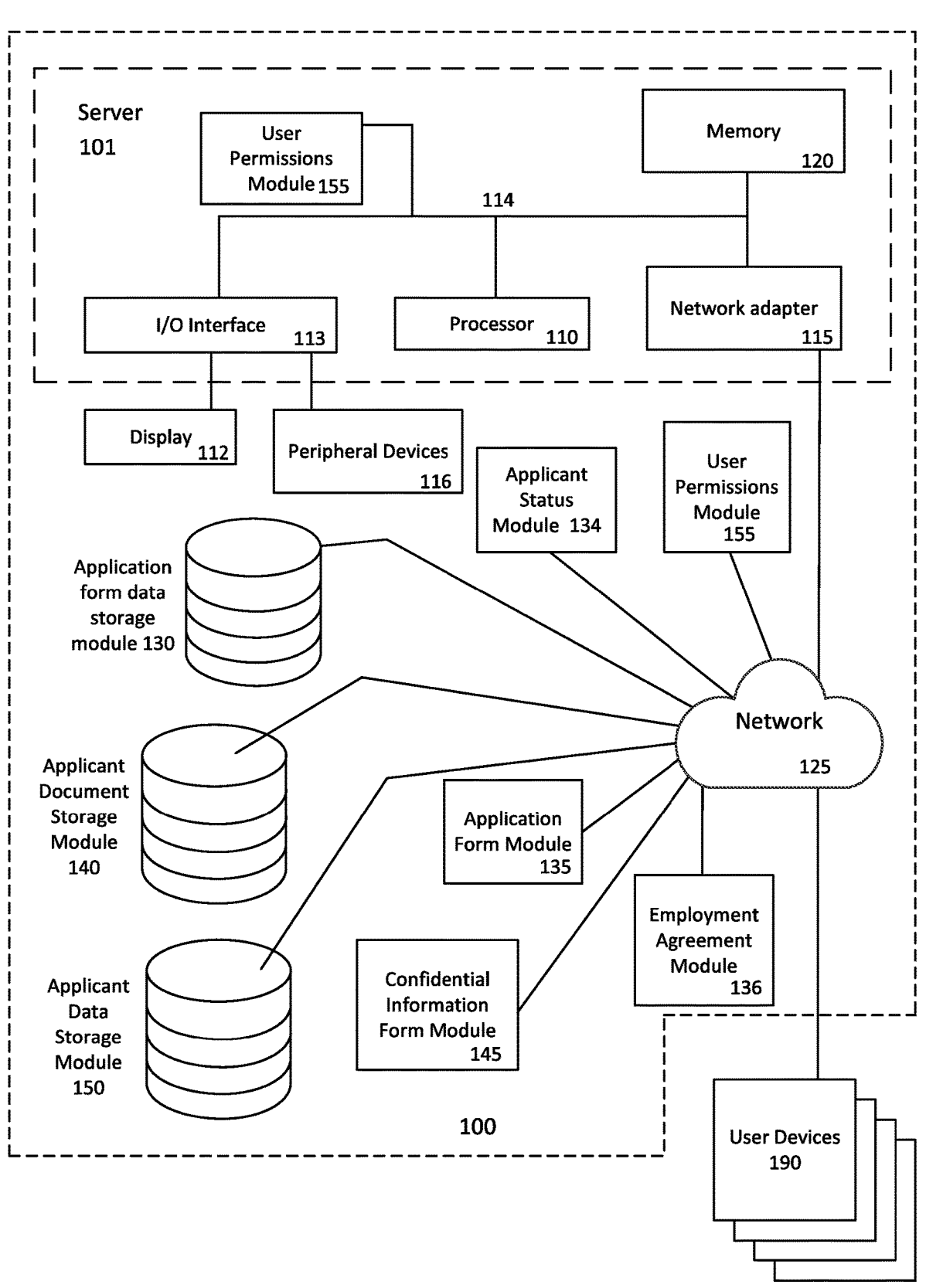
FIG. 1 shows an example of a computer system configured to support embodiments.

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed systems and methods can be arranged and combined in a wide variety of different configurations, all of which are contemplated herein.

Embodiments discussed herein relate to a system and method relating to computer implemented processes relating to procurement of applicants, recruitment of applicants to fill available job offerings, and in particular for the capture and management of personal information and personal confidential information from applicants during the recruitment process.

Particular embodiments relate to a system which facilitates a recruitment process which is flexible enough to allow for confidential information to be requested at any stage of the recruitment process, rather than after a job applicant is hired.

Particular embodiments also relate to ensuring confidential information is treated with care to minimise any opportunity for any security breaches. Due to the sensitive information, the information collected needs to be hidden from all users except for users who have been given the permission to view it. Embodiments discussed herein therefore include a user status parameter which is used to allow or restrict user access to confidential information. The status data simplifies the mass enablement and processing of user data which otherwise would require manual or individual oversight. Further, the embodiments discussed herein are further configured to restrict users who have permission to see confidential information from viewing data of applicants who are not hired. Accordingly, in some embodiments, the system is configured to restrict access to a job questionnaire or questionnaire data based on a ranking of a system user. In some embodiments, one user definition is that of a 'Payroll' user permission role. The system is configured to permit access to job applicant data based on the applicant having already been screened. The system is further configured to use the same permission to allow the payroll user to view the answers to the questionnaires, to edit the answers provided by job applicants, and generate a report of all of the answers for any applicants who have answered a selected questionnaire. The system is configured to restrict users who do not have the 'Payroll' user permission status from being able to view the answers to the questionnaires, and those users are not able to generate a report or view any data related to the answers to the questionnaires.

Data provided by job applicants needs to be collected and identified in such a way that it can seamlessly integrate into other Human Resource Information Systems (HRIS). Therefore, some embodiments are configured to create an XML based report representing an employee record file.

In some embodiments, the employee record file is further supplemented by a folder with correctly named documents that automatically feed the correct locations of an HRIS or document storage system. In some embodiments, the report may be in the form of an xml file which could be organization specific, but is automatically created for any organization by using column headers based off a combination of job details, applicant details, custom job details and from any new field headers created in the confidential information questionnaire. The answers are populated based on the data relating to the related column headers.

Due to the sensitivity of the data, it cannot remain within the confines of the recruitment system. Therefore, some embodiments relate to a system configured to automatically delete all applicant data once an applicant has been onboarded into an employer HRIS.

In some embodiments, the system is configured so that users who are hiring managers can choose whether a confidential job questionnaire is required job by job, being able to choose which questionnaire to use and where in the recruitment process the questionnaire should be sent to the applicants.

In some embodiments, the system is configured to store documents uploaded by users, and rename those documents according to a consistent format for every organization so that it can easily integrate with their HRIS system. Any document naming convention is possible. To process uploaded documents of the same type, the system is configured to add a field header to any document upload question which, combined with the applicant first name and last name, creates the document name, for example, Passport_Joe_Bloggs. A folder created for each onboarded applicant which includes all correctly named documents and the xml file for that applicant. The folder is able to be named by using any custom field header from the confidential questionnaire (e.g. IRD number), the applicant first name, last name and the business unit they are hired into. For example, 123456789_Joe_Bloggs_HeadOffice. An integration is created with an HR system to automatically transfer the new folder created into the clients correct folder filing system based on the business unit allocated in the file name which can be triggered based on an applicant status moving from 'Onboarding' into 'Hired'. The HR system checks the integrity of the data and alerts the HR team if there are inconsistencies or errors. Data and documents are automatically deleted from the recruitment system database as soon as a job is moved into the 'Archive' status. The same folder and file naming convention information may be used to distinguish applicants within the system.

Elements of the system may be referred to as modules which may in turn be implemented by a combination of hardware and software. For example, a computer hardware system which is configured to operate a number of software processes. The computer system may have any combination of local hardware devices and remote devices. For a computer system configured to connect with numerous user devices and facilitate processes in conjunction with those devices, the computer system will typically comprise one or more interconnected servers, and one or more remote devices, such as smartphone or personal computing devices which connect to the one or more servers.

FIG. 1 shows an example of a computer system 100 configured to support embodiments. In some embodiments, the computer system is a node in a cluster of nodes. Each node may be, for example, a cloud computing system. The computing node is only one example of a suitable system, such as a cloud computing node, and is not intended to suggest any limitation as to the scope of use or functionality of embodiments of the invention described herein. Another example is where each node is a module in the computing system. Regardless, the computing node is capable of being implemented and/or performing any of the functionality set forth hereinabove.

In the depicted system, there is an exemplary server 101 which includes a processor 110. The processor 110 may be configured to provide information processing capabilities in the computer system 100. Although the processor 110 is shown in as a single element, this is for illustrative purposes only, and may include a plurality of processing units. These processing units may be physically located within the same device or be multiple processors of multiple devices operating in coordination. The processor is configured to execute computer program modules. Reference to modules as used within this description is intended to be illustrative and not restrictive. Each module may represent a particular process or functionality as may be undertaken by any component of the system 100. Further, any module may provide more or less functionality than is described. For example, one or more of modules may be eliminated, and some or all of its functionality may be provided by one or more other modules. As another example, the processor 110 may be configured to execute one or more additional modules that may perform some or all of the functionality attributed to any module or modules. The processor itself may also be referred to as a module.

In a cloud computing node there is a computer server system 101 which is operational with numerous other general purpose or special purpose computing system environments or configurations. Examples of well-known computing systems, environments, and/or configurations that may be suitable for use with computer system/server include, but are not limited to, personal computer systems, server computer systems, client computing devices, handheld or laptop devices, multiprocessor systems, microprocessor-based systems, programmable consumer electronics, network PCs, minicomputer systems, mainframe computer systems, and distributed cloud computing environments that include any of the above systems or devices, and the like.

The computer system server 101 may be described in the general context of computer system executable instructions, such as program modules, being executed by a computer system. Generally, program modules may include routines, programs, objects, components, logic, data structures, and so on that perform particular tasks or implement particular abstract data types. The computer system server 101 may be practiced in distributed cloud computing environments where tasks are performed by remote processing devices that are linked through a communications network. In a distributed cloud computing environment, program modules may be located in both local and remote computer system storage media including memory storage devices.

The computer system server 101 is shown in the form of a general-purpose computing device. The components may include, but are not limited to, one or more processors or processing module 110, a system memory 120 module, and a data communications bus 114 that couples various system components including system memory 120 and processor 110. The data bus 114 represents one or more of any of several types of bus structures, including a memory bus or memory controller, a peripheral bus, an accelerated graphics port, and a processor or local bus using any of a variety of bus architectures.

The computer system server 100 typically includes a variety of computer system readable media. Such media may be any available media that is accessible by computer including both volatile and non-volatile media, removable and non-removable media. System memory 120 can include computer system readable media in the form of volatile memory, such as random access memory (RAM) and/or cache memory. The computer system server 100 may further include other removable/non-removable, volatile/non-volatile computer system storage media. By way of example only, a storage system 121 is provided for reading from and writing to a non-removable, non-volatile drive media. In such instances, each can be connected to the data bus 114 by one or more data interfaces. As will be further depicted and described below, memory 120 may include at least one program product having program modules that are configured to carry out the functions of embodiments of the invention.

Programs for execution by computing devices may be stored in memory 120, as well as an operating system, one or more application programs, other programs, and program data. Each of the operating system, one or more application programs, other program modules, and program data or some combination thereof, may include an implementation of a networking environment. Programs generally carry out the functions and/or methodologies of embodiments of the invention as described herein.

The computer system server 100 may also communicate with one or more external peripheral device modules 116 such as a keyboard, a pointing device, a display module 112 and other like devices. Communication can occur via Input/ Output (I/O) interface modules 113. The computer system/ server 100 can communicate with one or more networks 125 such as a local area network (LAN), a general wide area network (WAN), and/or a public network such as the Internet via network adapter 115. As depicted, network adapter 115 communicates with the other components of the system 100 via data bus 114. The network adapter module 115 may facilitate connection with any one or more user devices 190, including smartphones, laptops and other personal computing devices. Connection may be a wired and/or wireless interface, or facilitated by the internet.

The computer system server 100 is configured to store a program that, when executed in accordance with embodiments of the invention, operates the server 100 to undertake processes according to embodiments. Exemplary elements operable by the computer program are stored in one or modules as will be described by way of example. FIG. 1 further depicts a Form data storage module 130, an Applicant document storage module 140, an Applicant data storage module 150, an Application form module 135, a Confidential information form module 145, and a User permissions module 155. These modules are intended to be exemplary and presented for the purpose of illustrating interactive elements as may be used by any process. Any one or more modules may be combined with one or more other modules, or omitted as necessary to undertake any one or more below described processes.

Figure 2:
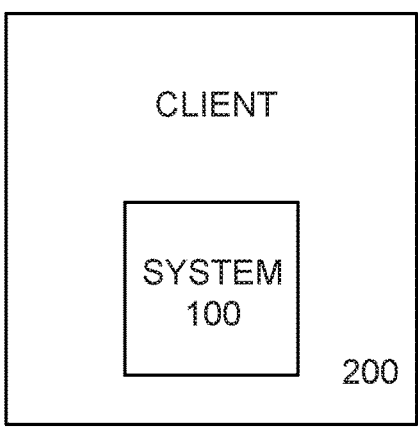
FIG. 2 shows a system which is integrated within the infrastructure of a business.
Figure 3:
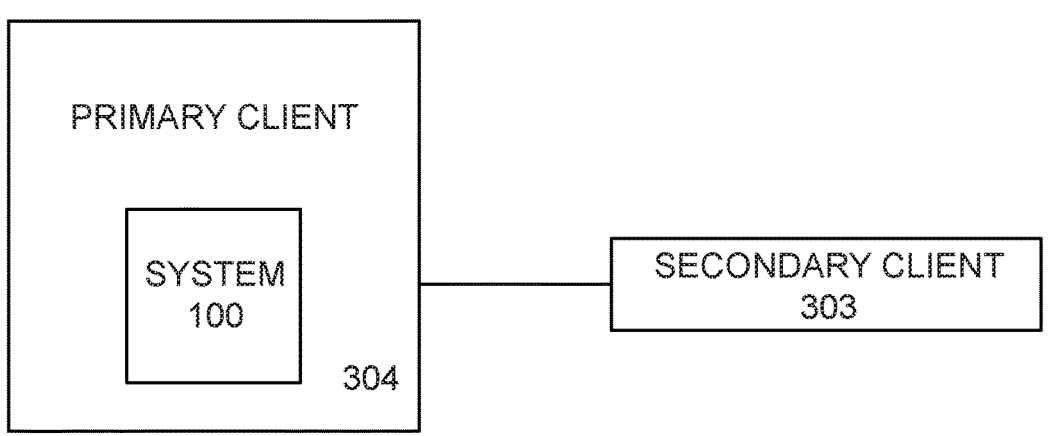
FIG. 3 illustrates a varied embodiment where the system is hosted within a primary business information technology system, and interfaces with a secondary business.
Figure 4:
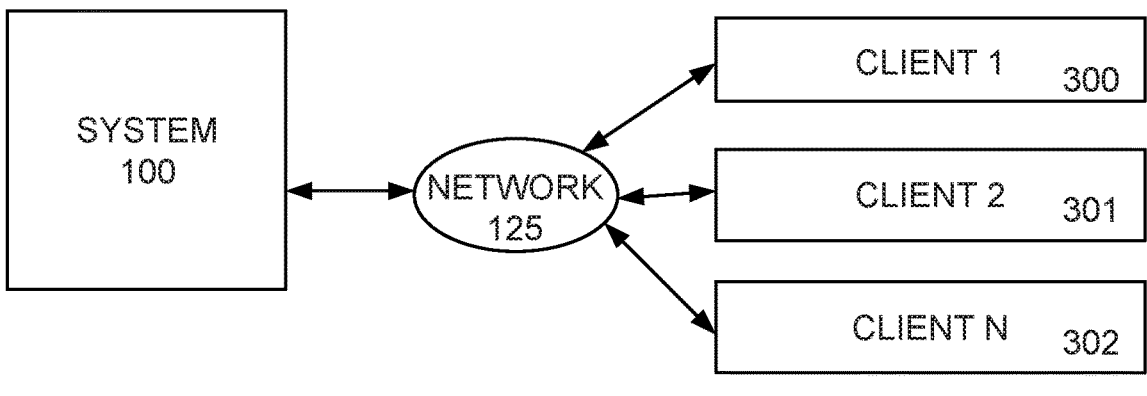
FIG. 4 shows a system connected to a number of client systems via a network.
Figure 5:
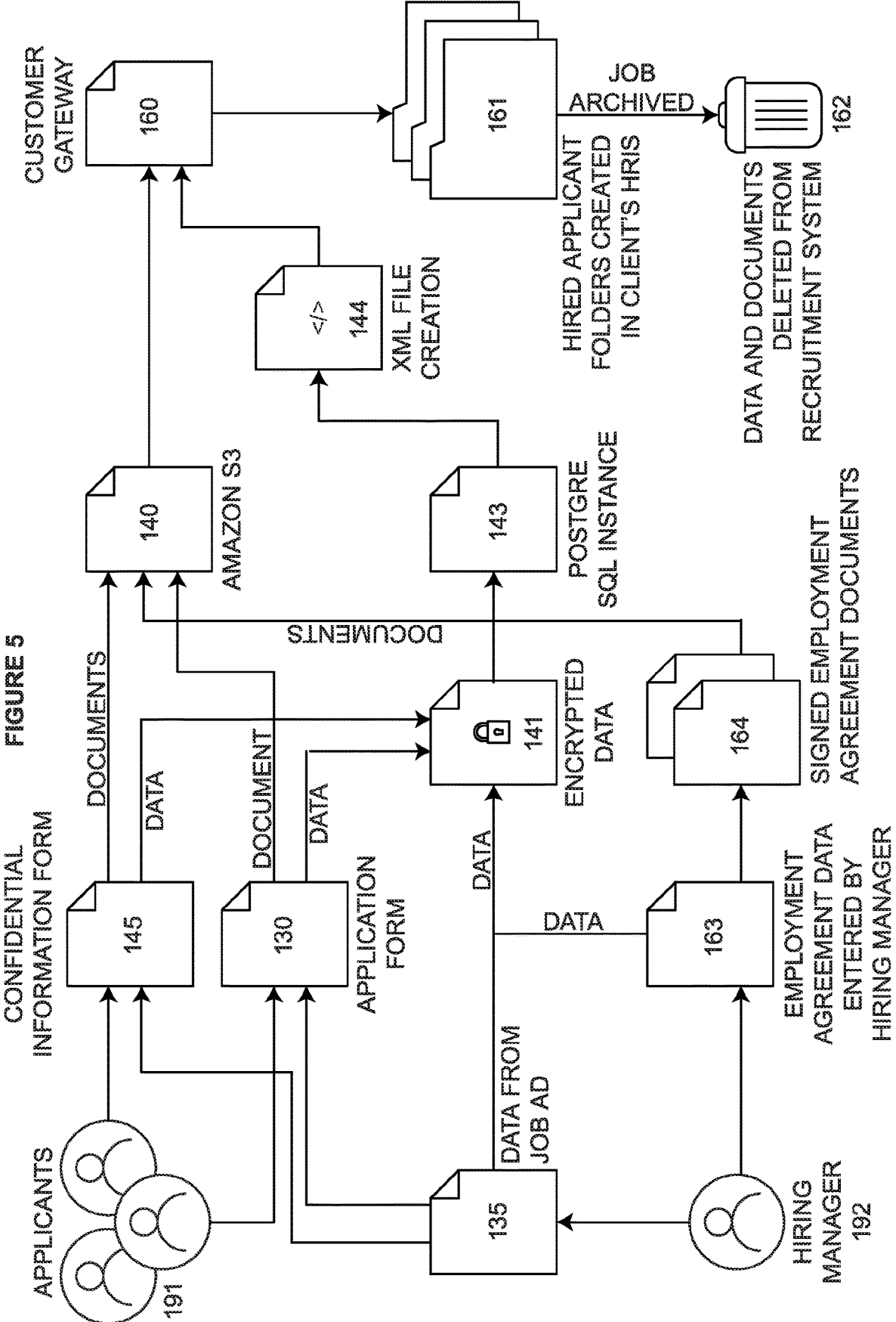
FIG. 5 shows a schematic representation of exemplary system modules and exemplary data flow paths for one exemplary embodiment.

In some embodiments, the system 100 is integrated with a pre-existing information technology infrastructure. For example, as a system which resides within a larger business system. FIGS. 2-4 illustrate different examples of system implementation. FIG. 2 shows a system 100 which is integrated within the infrastructure of a business. In this example, the business may be a larger business which hires a larger number of personnel. FIG. 3 illustrates a varied embodiment where the system is hosted within a primary business 304 information technology system, and interfaces with a secondary business 303. In this example, the primary business may offer recruitment services to other entities in conjunction with their own business practices. FIG. 4 shows a system 100 connected to a number of client systems 300-302 via the network 125. In this example, the recruitment process is operated by the system of a recruitment agency, and each client system represents a separate business who, for example, contracts the recruitment agency for recruitment service. In each of the examples shown in FIGS. 2-4, confidential information is contained and accessed separately from non-confidential information. Further, users are verified before confidential applicant information is made available to them.

The modules introduced in FIG. 1 are generally described in relation to one or more below described processes and in relation to functions the modules perform. Each of the following modules may be implemented by software, hardware, or a combination of software and hardware. One or more modules may be implemented by one or more servers or processors. Each module may be connected to any other module directly, or via a network connection.

In particular, in some embodiments, there is a user permissions module 155 configured to perform the function of establishing and managing a ranking of users of the system, and to control user to confidential information provided by applicants. In some embodiments, some users of the system are provided with a hierarchy or ranking. In some embodiments, the hierarchy provides a threshold, above which, some users are permitted access to, or restricted from accessing particular, modules, including applicant documentation or applicant information. In some embodiments, the user permissions module 155 is configured to permit access to confidential information from all users, except those who require such information as part of setting up a new employee in a business system. Examples, of such users include payroll personnel who will typically require access to confidential information such as bank account numbers in order to set up wage payments.

In this specification, there are three users referred to: an applicant user who is a person applying for a job; a hiring manager or HR manager who is the person in charge of the recruitment process and generally restricted from viewing confidential information; and a payroll user who is the person in charge of handling confidential information. Many other users are possible, as desired.

In some embodiments, the application form storage module 135 is configured to perform the function of storing and presenting question data for use in job applicant forms as a basis of a request for information a recruiter or hiring personnel will use to judge potential candidates. The system 100 is configured to facilitate access to the application form storage module 135 to any user who meets a requisite status according to that of the user permissions module, such as a hiring manager. For example, a job application form is prepared by a business looking to hire, or recruitment entity, and is intended to be presented to job applicants. In some instances in this specification, reference is made to a hiring manager as the person who prepares the job application form. The job application form may include any questions relevant to information required to select an appropriate applicant for further contact. The application form may be presented to applicants digitally, that is, by displaying questions or requests for information on the screen of their user device. The application form may further facilitate document upload features. In some embodiments, the system facilitates entry of questions or information requests from a permitted user such as a hiring manager. The system is configured to allow entries to be loaded into a data base of entries. The entries are stored and may be later selectively recalled for inclusion to a new job application form.

In some embodiments, there is an applicant form presentation module 130 configured to perform the function of presenting questions and requests for information to job applicants. In some embodiments, the applicant form presentation module 130 is configured to receive applicant form data from the applicant form storage module 135. In some embodiments, the applicant form presentation module 130 is configured to be downloaded for execution on one or more user devices 190. For example, the applicant form presentation module may include a webpage configured to download data from the applicant form storage module and display information to users of the device. In some embodiments, the applicant form presentation module 130 is configured to include one or more fields adapted to allow users to input data for capture by the system.

In some embodiments, the confidential information form module 145 is configured to perform the function of presenting questions and requests for information to job applicants whereby the answers to those questions or information requests are confidential in nature. Confidential means information which is deemed to be irrelevant, illegal or unethical for hiring personnel to have knowledge of before a job applicant is hired. In some embodiments, the confidential information form module 145 is configured to receive applicant form data from the applicant form storage module 135. In some embodiments, the confidential information form module 145 is configured to be downloaded for execution on one or more user devices 190. For example, the applicant form presentation module may include an electronic form such as a webpage configured to download data from the applicant form storage module and display information to users of the device. In some embodiments, the applicant form presentation module 130 is configured to include one or more fields adapted to allow users to input data for capture by the system. In some embodiments, the system is configured to provide the confidential information form module 145 to a job applicant at any stage of the hiring process. Confidential information may include information such as passport details, bank account details, medical data, and the like.

In some embodiments, there is an applicant data storage module 150 configured to perform the function of a database configured to store applicant data received from the electronic form of the applicant form presentation module 130 or the confidential information form module 145. In some embodiments, the applicant data is configured to encrypt the applicant data before storage. The applicant data storage module 150 is configured to receive information from the applicant form presentation module 130.

In some embodiments, the applicant document storage module 140 is configured to perform the functions of storing any documents which may be submitted by applicants as part of completing the job application form and the recruitment process. For example, documents relevant to a recruitment process include those documents received in response to questions or information requests provided by the applicant form presentation module 130 and/or confidential information form module 145.

In some embodiments, the system is configured to generate a report that creates the column headers based off a combination of general job details which may be questions common to any job questionnaire (e.g. job location, job industry, work type, pay type), applicant details (e.g. address, contact details), from custom job details and from new field headers which can be created from a confidential information questionnaire. In some embodiments, there is an employment agreement module 136 configured to generate an employment agreement document populated from data gathered from the application form confidential information for and/or any submitted documents.

In some embodiments, the system further includes a job applicant status module 134 which is configured to track job applicants through an application phase, through a hiring process, and to a hired on not hired phase. The applicant progress module 134 may be configured to receive inputs indicating a change of status to an applicant, and to output instructions to one or more other modules when a change in status occurs. For example, when an applicant status changes to hired, the status module 134 may be configured to transfer applicant data to a client HRIS system, and delete and local records as will be explained further below. In another example, the status module 134 is configured to send a confidential information request to a job applicant following a change of status, such as the applicant being hired. In such embodiments, the system is configured to receive data representative of an applicant hire, and in response, the user status module is configured to verify one or more system users who meet user permission criteria, and transmit confidential information linked to the hired applicant to the verified user.

Information relating to an applicant, including confidential and non-confidential information, may be linked to a particular applicant many various ways. In one example, a unique file naming convention is used for each applicant.

The exemplary applicant status module 134 is configured to associate a parameter to each applicant according to a current stage in their hiring process. The hiring process may include as many stages as necessary for any business, and the stages may be defined by a system user such as the hiring manager. The applicant status module 134 is configured to associate the parameter as state data which represents the stage in the hiring process. Many parameter states for each applicant are possible, such as:

Applicant identifying details
Shortlist
Interview
Onboarding
Offer approved
Verbal Offer made
Verbal Offer Accepted
Background checks requested
Background checks complete
Employment documents sent
Employment documents complete
Hired FIG. 4 shows a schematic representation of exemplary system modules and exemplary data flow paths for one exemplary embodiment. In particular, a hiring manager 192 is connected to the application form storage module 135 adapted for the storage of job application information and confidential information requests. The system is configured to provide access to the user device of the hiring manager based on a permission criteria being met. The hiring manager is provided with access to modules including job vacancy information module, the job application form and confidential information form modules, and the database containing application forms completed by job applicants.

In exemplary embodiments, the hiring manager is connected to the system by way of an electronic interface on their personal user device 192. The system is configured to facilitate the hiring manager uploading questions and other data to the application form storage module for later recall by the application form 130 and display to applicants. Further, the hiring manager is able to access stored information and assemble a job application form by selecting any stored questions they may want to include, and inputting any new questions. The completed job application form is output to the applicant form presentation module 130.

Similarly, the system is configured to facilitate any job applicants 191 viewing of the job application form by connection with the applicant form presentation module 130 from their personal computing device. The applicant form presentation module 130 is configured to capture data input by a job applicant in support of their application.

The exemplary system is further configured to store information entered by job applicants to the confidential information form module and job application form module. In some embodiments, the system includes an encryption module 141 and information entered by job applicants is encrypted by the module 141 before storage in the system. Documents uploaded to the system 100 by job applicants are stored on a storage module 140 such as the Amazon S3 server. Information entered by job applicants is stored on a storage module 143 such as a postgress SQL database. In some embodiments, the system is configured to manage decryption of stored data according to the operation of the user permissions module. For example, decryption of stored confidential information is provided to system users who are verified by the permissions module.

In some embodiments, the system is configured to receive data representing a change in a parameter state from a client subsystem, or via a user interface. The applicant status module 134 is configured to receive the parameter state data and implement one or more processes, such as sending the confidential information form to an applicant.

To integrate with client systems, there are three key considerations, including the system 100 is configured to compile an XML file containing the applicant data received from the job application form module 130 during the application process and subsequent filling out of the confidential application form, creating a folder for the required documents as part of the above process, sending the folder with the documents and XML to a client system configured to read the XML file.

In XML File, the applicant and job data ideally have field names in CSV format with no spaces or special characters.

Field names from the confidential information questionnaire are as defined according to the HR manager question creation. A folder may be created with the above XML file and the agreed documents, the documents include documents that have been uploaded by applicants as part of completing a confidential information questionnaire, documents from the employment agreement module that are in the completed state, the application form, and attachments uploaded in notes against applicants.

In some embodiments, document names are defined by the field header within the questions that the HR manager creates within the confidential information questionnaire, or the documents names within an employment agreement. Documents from applicants named names according to the applicant name. The document names may also include the applicant first and last name.

---

Exemplary XML formatting and data includes:

```
<?xml version="1.0" encoding="UTF-8"?>
<Employee>
<FirstName>Roger</FirstName>
<LastName>Roger</LastName>
<PreferredFirstName></PreferredFirstName>
<PrimaryContactNumber>0275556789</PrimaryContactNumber>
<SecondaryContactNumber></SecondaryContactNumber>
<Email>haretoday@gmail.com</Email>
<StreetAddress>11 Fudd Place</StreetAddress>
<City>Te Puke</City>
<Region>BOP</Region> - Not Used
<PostalCode>4321</PostalCode>
<Country>New Zealand</Country>
<HireDate>08/04/2020</HireDate>
<JobTitle>Packer/Stacker</JobTitle> - Ignored
<Hierarchy>Main Road</Hierarchy>
<HiringManager>Marty Gray</HiringManager>
<Industry>Agriculture/Forestry/Fishing</Industry> -
<Occupation>Packer and Packager, Hand</Occupation>
<JobCountry>NZ</JobCountry>
<JobRegion>Bay of Plenty</JobRegion>
<WorkType>FullTime</WorkType>
<JobType>Casual/Temporary</JobType>
<Brand>Packhouse</Brand>
<PaymentType>Hourly</PaymentType>
<SearchPayRateFrom>18.90</SearchPayRateFrom>
<SearchPayRateTo>18.90</SearchPayRateTo>
<SalaryAdditionalText></SalaryAdditionalText>
<SalaryPerAnnum></SalaryPerAnnum>
<WagePerHour>18.90</WagePerHour>
<StartDate>09/04/2020</StartDate>
<EndDate>21/06/2020</EndDate>
<HoursOfWork></HoursOfWork>
<SiteName>Post Harvest</SiteName>
<AdditionalInfo></AdditionalInfo>
<WorkVisa>Yes</WorkVisa>
<UnionMember>Yes</UnionMember>
<HiredPosition>Seasonal Worker Main Road</HiredPosition>
<CustomToken1></CustomToken1>
<CustomToken2></CustomToken2>
<CustomToken3></CustomToken3>
<CustomToken4></CustomToken4>
<IRDNumber>043922268</IRDNumber>
<TaxCode>M SL</TaxCode>
<Gender>Male</Gender>
<DateofBirth>19/11/1972</DateofBirth>
<NextofKinName>Elmer Fudd</NextofKinName>
<NextofKinRelationship>Farmer</NextofKinRelationship>
<NextofKinPhone>02725551111</NextofKinPhone>
<NextofKinCountry>New Zealand</NextofKinCountry>
<DriversLicense>No</DriversLicense>
<Nationality>New Zealand</Nationality>
<Ethnicity></Ethnicity>
<VisaExpiryDte>23/12/2022</VisaExpiryDte>
<BankAccountNumber>12-1234-1234567-123</BankAccountNumber>
<Kiwisaver>Yes</Kiwisaver>
<KSPercentage>3%</KSPercentage>
```

-continued

Exemplary XML formatting and data includes:

```
<KiwiSaverUnder18>No</KiwiSaverUnder18>
<KiwiSaverOver65>No</KiwiSaverOver65>
<Medication>No</Medication>
<Glasses>No</Glasses>
<EmergencyIntervention>No</EmergencyIntervention>
<EvacuationAssistance>No</EvacuationAssistance>
<PreExsitingConditions>No</PreExsitingConditions>
<MedicationNotes>MedicationNotes</MedicationNotes>
<GlassesNotes>GlassesNotes</GlassesNotes>
<EmergencyInterventionNotes>EmergencyInterventionNotes</
EmergencyInterventionNotes>
<EvacuationAssistanceNotes>EvacuationAssistanceNotes</EvacuationAssistanceNotes>
<PreExistingConditionsNotes>PreExistingConditionsNotes</PreExistingConditionsNotes>
<DaysAvailable>Monday-Tuesday-Wednesday</DaysAvailable>
<ShiftsAvailable>Day-Night</ShiftsAvailable>
<FixedTermReason>Fixed Term Reason Placeholder</FixedTermReason>
<PostalAddressDifferent>Yes</PostalAddressDifferent>
<PostalAddress1>PA_Address1</PostalAddress1>
<PostalTownCity>Albany</PostalTownCity>
<PostalPostCode>1234</PostalPostCode>
```

In some embodiments, the system comprises a customer gateway 160. For example, referring to the examples shown in FIGS. 3 and 4, a client subsystem may connect to the system 100 by way of a customer gateway 160 which controls access of client users to stored information. In some embodiments, the system is configured to control access to stored information based on a user status parameter. User access is controlled by, for example, the permissions module 155 which may, in some embodiments, be integrated with the gateway 160. The user status parameter may be assigned to client users, by the permissions module 155, based on their job function. In particular, the system is configured to provide access to data based on the client user status parameter. For example, the applicant data storage module 140, containing documents uploaded up job applicants, may be provided to client users based on meeting a user status parameter.

In some embodiments, the system 100 is configured to allow client access to a particular job applicant based on receiving information indicative of that job applicant being selected for hire. Further, the system is configured to restrict or prevent access to the confidential information stored by the server until receiving information indicative of that job applicant being selected for hire.

In some embodiments, the system is configured to assign a parameter to data entries representing job applicants, whereby that parameter has at least two states, including a first state representing an applicant who has not been hired, and a second state representing a hired applicant. The system is configured to receive information regarding the status of the parameter from, for example, the client subsystem. The changing of the parameter status may be based on applicant review by a hiring manager or similar, and selection of that applicant for hire. The status parameter may be updated by inputs by the hiring manager. Typically, access to both the confidential information and application form data of each of a large number of applicants needs to be coordinated so that confidential information is not accessible until the hiring manager, or other user of equivalent role, has made a hiring decision. Updating of the status parameter for a particular applicant by the hiring manager, or other user of equivalent role, allows the system to subsequently allow access for a payroll user, or user of equivalent status, to the confidential information. It also allows the system to receive the confidential information and maintain secrecy ahead of a hiring decision by the hiring manager.

In some embodiments, the system is configured to undertake certain tasks according to a parameter state, or a change in parameter state. In some embodiments, a system user is able to configure particular tasks to be undertaken by a particular parameter state.

In some embodiments, the system 100 is configured to create a data structure for each hired applicant. For example, the system may be configured to create a folder 161 containing applicant data, including confidential information and general information. In some embodiments, the data comprises an XML report of all data captured by the system relating to one applicant. The system is further configured to copy applicant documents to the folder. In some embodiments, the folder is copied to a client system, using a file transfer facility such as Filebound. The creation of the folder containing all applicant information and the applicant documents, and the transfer of that folder contents to a client subsystem facilitates a 'handover' from the system to the client subsystem. Once the handover is completed, a deletion module 162 in the system 100 is configured to delete confidential information and documents which are stored on the applicant document storage system and the applicant data storage. In this way, confidential information, is not stored for any longer than is necessary. This process minimises the time such information is held and thereby minimises security risks by ensuring that information exists for a minimum time period.

In some embodiments the system is configured to produce an XML file containing a summary report of applicant information. The contents of the XML file facilitates the automated creation of employee details in a human resources system, such as HRIS.

A user can create as many different questionnaires as they like. In some embodiments, the system is configured to provide a custom questionnaire builder with custom field headers that link into the xml file, document naming convention and folder naming convention. The software will automatically select the correct data and documents and create the required xml file, documents and folders.

In preferred embodiments, the permissions module is configured to identify a user as a payroll user. The permissions module is configured to permit payroll users to access to view applicants in the interview, onboarding and hired status for all jobs. The payroll user also has access to view the applicant details and the employment agreement custom data fields. The payroll user also has access to view the answers to the questions in the confidential data request form, edit the answers to the Confidential Questionnaire (such as to correct typographical errors), and to download a CSV report containing all applicant data. The CSV file contains the contents from all fields from the confidential information questionnaire. Fields can be labelled according to the question asked.

Figure 6A:
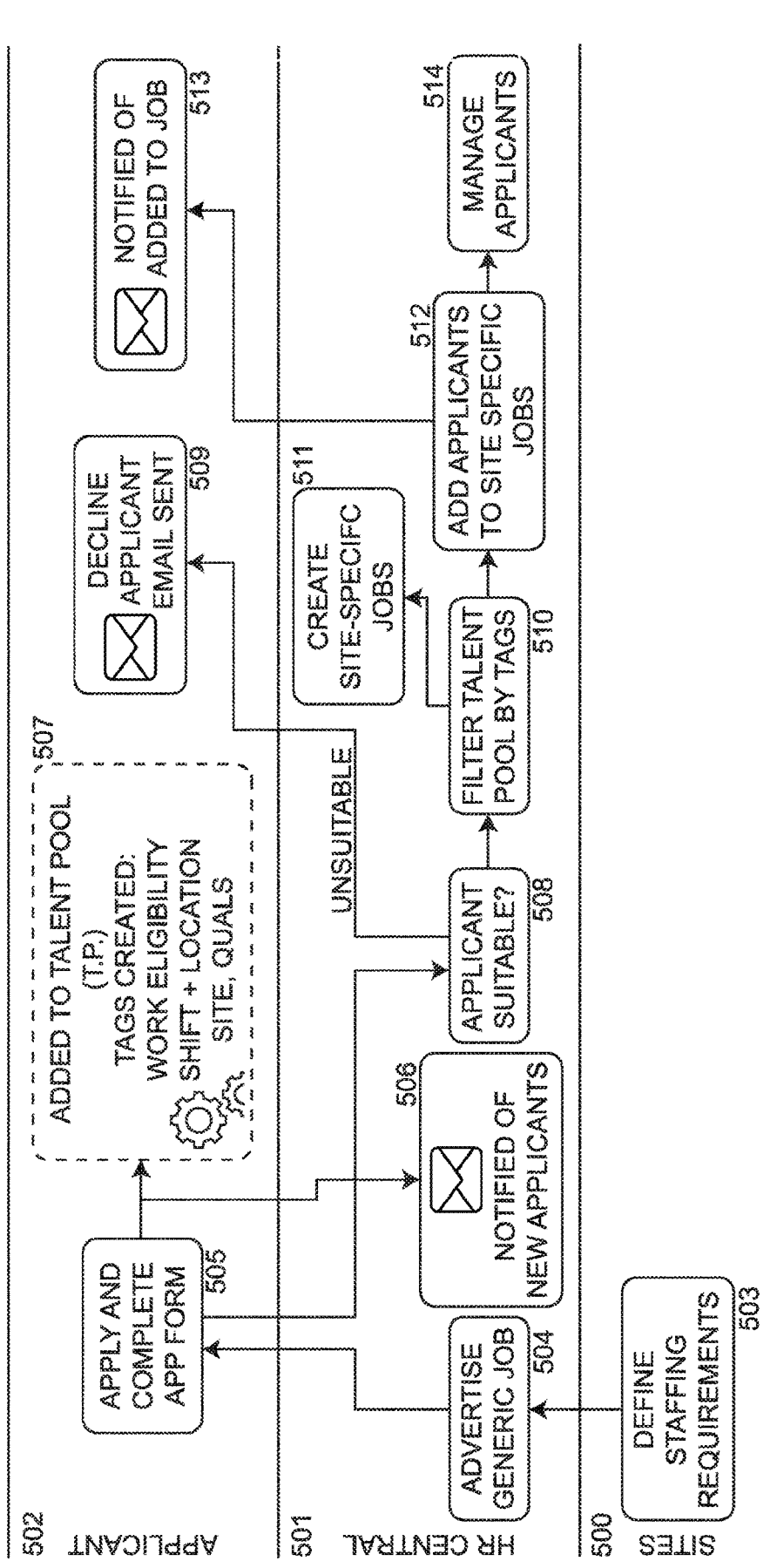
FIG. 6A shows an exemplary overview of a job loading and hiring process where a large number of applicants may be assigned to available jobs.

FIG. 6A shows an exemplary overview of a job loading and hiring process where a large number of applicants may be assigned to available jobs. For example, in the fruit picking industry, there are various geographically dispersed sites where groups of hired applicants will be sent to. The process is particularly suitable for the management of hiring applicants and allocating successful applicants to job sites. The depicted process is divided into rows, representing parties to the recruitment process, including a job site 500, an HR central system user 501, and an applicant 502.

The steps include:

503: A client component 500 defines a staffing requirement;

a 504: An HR component 501 prepares a job advertisement based on the staffing requirement. The HR component may select job application questions from a prepared list of questions, or they may define their own questions. For example, hiring personnel select an application form (which may have questions pre-configured by the HR user through an administration interface of the system). They also select a confidential questionnaire at the same time and at what point in the recruitment process they want the applicant to complete this questionnaire;

505: A job applicant 502 completes the job application form to apply for the job;

506: The system is configured to output a notification of any new applicant to the HR component 501;

507: The system is configured to generate a list of job applicants. Applicants may be further categorised according to responses to answers in the job application questionnaire. In some embodiments, the system is configured to add metadata or tags to answers matched with predetermined responses. For example, answers and predetermined responses may include a job site preference, hours of work preference, qualifications.

508: The HR component is provided with job non-confidential job applicant answers and determine role suitability. The system is configured to receive a status parameter representing role suitability, including data representative of being suitable or unsuitable for the role;

509: The system is configured to email job applicants having a status parameter deemed unsuitable for the role:

510: The system is configured to group job applicants according to allocated tags.

511: The HR user creates a job according to a job requirement at a job site. For example, jobs categorised by location;

512: The system is configured to match job applicants to site specific jobs based on tags matching criteria of the job site. This step further comprises assigning status parameter data representing a hired job applicant to that job applicant, or other functions such as automatically generated and sending the confidential information questionnaire:

513: The system is configured to transmit an email to job applicants who have a status parameter indicative of being added to a job site;

514: Continued in the process of FIG. 6B.

FIG. 6B shows an exemplary hiring process, facilitated by the system 100, from the perspective of a system user who is a hiring manager. The depicted process is divided into rows, representing parties to the recruitment process, including a Client HR system 600, an HR central system user 601, and a pool of applicants 502.

The steps include:

604: a user logs into the system. The logging in process facilitates verification of a user and their accessibility to information stored by the system;

605: The HR user short lists suitable applicants. The system is configured to record a change in applicant parameter state according to the input received from the HR user;

606: The user status module is configurable to monitor for a change in applicant status, and to automate functions. For example, a change in applicant status to 'shortlist' can be configured to automate sending of an email to the applicant to advise of suitability for the role applied for;

607: An HR user can transmit data to the applicant status module 134 representing any further optional steps in an applicant hiring process, such as conducting an interview.

608: An HR user optionally screens the applicant;

609: An HR user determines whether an applicant passes any screening process; Optionally, the applicant status module 134 is configured to determine a declined applicant status, and automate one or more processes, such as sending an email to the applicant notifying them their application is declined;

610: A decline email is sent to job applicant, based on a change of status determined by the applicant status module 134;

611: For an applicant deemed by HR to pass the screening process, the applicant status module 134 records an application status of moving them to an onboarding step;

612: The applicant status module 134 is able to be configured to record applicant status from a list of predefined statuses, and any one or more of those statuses is configurable to automate any one or more processes, such as sending the confidential questionnaire to the applicant. The HR user is able to construct the confidential information questionnaire according to details required by the business. The system determines a change in applicant status, and transmits the prepared confidential questionnaire to the applicant;

613: The applicant completes the confidential information questionnaire. The system is configured to determine the completion of this task and update the applicant status accordingly.

614: The HR user confirms the applicant agrees to employment. The applicant status module 134 is able to be updated accordingly;

615: Hired applicants require employment agreement documentation which may be prepared by the HR user, and signed by the hired applicant to complete the employment agreement. The system automatically generates the employment agreement based on job, applicant and missing details from hiring manager.

616: the applicant status module 134 is configured to transmit employment agreement documentation and any other desired documentation to the applicant; in some embodiments, the applicant is provided with a link. When the applicant clicks on the link, they are taken directly to the questionnaire and they do not need to login. The applicant answers the questions and then this questionnaire is added to the application process for this applicant. In some embodiments, the system is configured to only send a link to the applicant's user interface where they are prompted to view and electronically sign the employment agreement and offer documents.

617: The hired applicant uploads their documentation to the system 100. In some embodiments, the system is configured to update the applicant status module 134 when documents are uploaded by the applicant. The system is operable to determine the subsequent change in applicant status, and automate one or more actions in response;

618: The applicant status is changed to hired;

619: The system is configured to provide access to stored confidential information, to any user verified as permitted to view such information by the permissions module 620: The system is configured to automate the sending of induction information to the applicant based on the change in applicant status to hired;

621: The system is configured to send an email to the applicant containing the induction information and any other processes, such as sending all applicant data to the payroll user, and deleting at least the applicant's confidential information from storage.

Further and additional embodiments of the invention will now be described. FIG. 54 shows a system according to a further embodiment of the invention. A first user controls a first user module. In this example the first user is a hiring manager. The first user module allows the first user to define data to be received from the applicants 191 and included in a job advert 135. The first user module generates an application form 130 used online to receive job application data defined by the first user. The form 130 is defined by control inputs of the first user to identify information required for an application by applicants 191. Data defined by the first user is received from multiple applicant parties 191. The first user module displays the application form 130 as an online form, such as via a mark-up language file. The first user module displays to the first user application form data received from given ones of the applicants 191.

The first user module is operable to receive control inputs from the first user to update a status parameter to allow the first user to update the status of each given one of the applicants. Typically this is subsequent to the first user viewing application form data displayed by the first user module and making a decision that the applicant is suitable and should be shortlisted or that the applicant is hired.

The first user module, in this particular embodiment, is also controllable by the first user to allow the first user to define confidential information to be requested from and received from the applicants 191.

A second user module provides access to a second user to the confidential information. Typically this is dependent on the status of the application, as controlled by the first user via the first user module. Typically, the second user is not able to access the confidential information until the status has been appropriately updated by via the first user module. Typically also the first user does not have access to the confidential information at any stage.

The reader may recognise the application form data as an example of data carrying a first subset of information received from an applicant party and will recognise the confidential information as data carrying a second subset of information received from an applicant party.

The above described embodiments provide a system which allows free configuration of modules from the recruitment system into any HRIS in a way that is able to be automated for every different organization. Configurations include the naming of the documents, the naming of the folder headers, the automation of a custom xml file with headers taken from many different sources and modules and field types.

At any point in the hiring process an applicant may be rejected. Accordingly, the applicant status is updated with data indicative of such, and any one or more routines may be triggered by the status update, such as automating an Applicant notification, and deleting applicant stored data including confidential information.

One advantage of this system is that applicants do not need to manually fill out information at the time of application, or at the time of induction. Tax forms, proof of identity, bank account details etc are all collected online, typically after an offer has been accepted by the job applicants. Employment agreement documents are signed online, all required data is collected before the applicant reaches an induction program. The Human Resources team do not need to manually upload data and documents into their HR systems. This process dramatically cuts down the induction time and therefore time to hire whilst reducing mistakes that manual entry introduces. In situations where hundreds of applicants must be processed, the time saving is significant, there is substantially reduced risk of data entry errors, and confidential information is restricted to only those who require information, or more importantly, is restricted from view by those tasked with hiring applicants.

Other systems that try to do the same thing cannot collect all of the same data and documents from all of the different sources in the required format in a way that can be automated—not only for one client but for many clients. In order to try and achieve the same thing, other systems need to collect private and confidential data at the time of job application-which is illegal. But they still cannot get all of the data required at induction as some of the information is not known at the time that an applicant applies for a job, such as pay rate, where the applicant will work, what hours they will work, what superannuation scheme or amount the applicant wants to be on, their tax code, bank account details, which days of the week the hired applicants will work, what shifts they will work, or medical conditions and the like.

Those skilled in the art will also appreciate that in some embodiments the functionality provided by the routines discussed above may be provided in alternative ways, such as being split among more routines or consolidated into less routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

The invention claimed is:

1. A computer implemented system operable to coordinate the receipt of data provided by each of multiple applicant parties and to coordinate access of data received from each party to first and second users of the system to process applications from multiple applicant parties, the system comprising:

a computer server storing a program which when executed is operable to store a user permissions status, to store applicant data received, to store a form data, a and to store confidential information, and a first user interface which is:

a) controllable by a first user to define a form to be stored and thereby accessed to be filled online by each of said parties to receive form data from each one of said parties, b) operable to display form data received from each one of said parties and store said form data, and c) to receive a control input to update a status of select applicant parties;

the applicant party interface operable to display to said parties the form generated, to receive form data entered by each one of said parties, and to receive confidential data from each one of said parties and store said applicant data; and a second user interface operable to provide access for a second user to the confidential information of each applicant party wherein the second user interface is controlled to permit access to the applicant data stored dependent on the status of said each applicant party.

2. The system as claimed in claim 1, further configured to separate said form data into first and second subsets of data relating to each of multiple parties said data being processed collectively by first and second users wherein:

a first user interface allows the first user to define the form used by the applicant parties to:

provide the first subset of data, allow the first user to access the first subset of data received, subsequently update the status of given parties to indicate a status of the processing of the data, and control the prompting of select parties to provide the second subset of data and the second user interface allows a second user to access the second subset of data subsequent to the status being updated to allow the second user to access the second subset of data of each said party subsequent to a status update made under the control of the first user.

3. The system of claim 1 further configured to facilitate the collective processing by the first and second users without the first user having access to the second subset of data and with the second user having access to the second subset of data dependent on control by the first user.

4. The system as claimed in claim 1 further configured to assign a permissions ranking to at least the first and second users, and wherein the system is configured to apply a threshold to the ranking, users above which are permitted access to form data stored by said applicant parties dependent on the status of the applicant party.

5. The system as claimed in claim 4, further configured to assign a permissions ranking to at least the users, and wherein the system is configured permit access to confidential data stored of said applicant parties dependent on the status of the applicant party and ranking of the users.

6. The system as claimed in claim 5, further configured to store data representing applicant status during a job hiring process, the status comprising data indicative of one or more of, in temporal order: Applicant identifying details; Shortlist; Interview; Onboarding; Offer approved; Verbal Offer made; Verbal Offer Accepted; Background checks requested; Background checks complete; Employment documents sent; Employment documents complete; Hired or rejected, and/or job status: Archived.

7. The system as claimed in claim 6, wherein the system is further configured to transmit applicant data to a client HR system dependent on an applicant party hired status.

8. The system as claimed in claim 7, further configured to delete applicant confidential data dependent on the status of the applicant party rejected status or job status: Archived.

9. The system as claimed in claim 1, wherein the system is configured to receive data from a client system, the data operable to change the applicant status.

10. The system as claimed in claim 9, wherein the first interface is further controllable by the first user to define the applicant status data.

11. The system as claimed in claim 1, wherein: the system further comprises a customer gateway operable to control access of client users to information stored, and access of the client users to the information is determined by a user status parameter stored.

12. A computer system which separates first and second subsets of data relating to each of multiple parties said data being processed collectively by first and second users, the system comprising:

a first user interface controllable by the first user to define a form operable by the parties to: capture the first subset of data from the parties, allow the first user to access the first subset of data received; subsequently update a status of select parties to indicate a status of the processing of the captured data, and control the prompting of select parties to provide the second subset of data; and a second user interface that allows the second user to access the second subset of data subsequent to the status being updated to allow the second user to access the second subset of data of each said party subsequent to a status update made under the control of the first user.

13. A system which is configured to:

control access of the first user based on a first permissions criteria to:

assemble an electronic job application form including a request for information; and assemble an electronic confidential information form including a request for confidential information;

store electronic job application form data completed by each of one or more job applicants via a user device;

store electronic confidential information form data completed by each of one or more job applicants via a user device;

populate a data structure containing data from the job application form and the confidential information form; and job data;

assign a status parameter to a selection of the one or more electronic job application forms, the status parameter representing a hired applicant; and facilitate access to the data of the data structure based on:

the status parameter; and a second permission criteria that:

excludes the first user status, and represents a user access of a new employee processing operator.

\* \* \* \* \*